United States Patent [19]

Yamamoto

[11] Patent Number: 5,289,392
[45] Date of Patent: Feb. 22, 1994

[54] ADDER

[75] Inventor: Makoto Yamamoto, Tokyo, Japan

[73] Assignee: Yozan, Inc., Tokyo, Japan

[21] Appl. No.: 57,781

[22] Filed: May 6, 1993

[30] Foreign Application Priority Data

May 15, 1992 [JP] Japan .................... 4-148468

[51] Int. Cl.$^5$ .............. G06J 1/00; G06F 7/50
[52] U.S. Cl. .................... 364/602; 364/784
[58] Field of Search .......... 364/602, 784, 786

[56] References Cited

U.S. PATENT DOCUMENTS 3,586,845  6/1971  Komamiya et al. ............. 364/784
3,728,531  4/1973  Young, Jr. ....................... 364/784

*Primary Examiner*—Tan V. Mai
*Attorney, Agent, or Firm*—Cushman, Darby & Cushman

[57] ABSTRACT

This invention has an object to provide a device possible to add analog values. The adder of this invention input an output of an operational amplifier to a reference voltage terminal on the output side of another operational amplifier, adds analog values, judges in digital if a carry is performed or not with respect to a value after addition including a carry-in, the value after addition is increased or decreased according to the judgment.

1 Claim, 4 Drawing Sheets

ADDER

FIELD OF THE INVENTION

The present invention relates to an adder, especially to that effective for adding analog values.

BACKGROUND OF THE INVENTION

A digital computer is mostly used for a programmable computer. The function of it is radically improved due to the progress of the technology of fine processing of LSI. However recently, the technology of fine processing is near the limit and new breakthrough is expected.

SUMMARY OF THE INVENTION

This is invented to resolve such circumstances and has an object to provide a device possible to add analog values.

The adder of this invention input an output of an operational amplifier to a reference voltage terminal on the output side of another operational amplifier, adds analog values, judges in digital if a carry is performed or not with respect to a value after addition including a carry-in, the value after addition is increased or decreased according to the judgment.

PREFERRED EMBODIMENT OF THE PRESENT INVENTION

Hereinafter an embodiment of an adder according to this invention is described with reference to the attached drawings.

Figure 1:
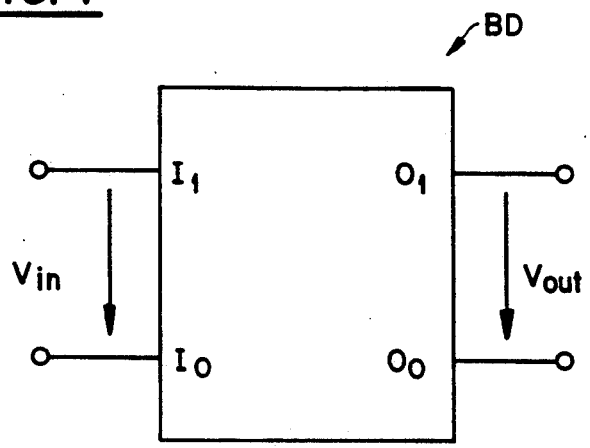
FIG. 1 shows the outline of a fundamental element device used in the embodiment.

FIG. 1 shows a fundamental element device "BD" for structuring an adder. This fundamental element device comprises an operational amplifier for generating an output voltage "Vout" for an input voltage "Vin" in gain "1". Input voltage Vin is impressed on non-invasive input terminal "$I_1$" on the input side and inversion input terminal $I_0$ is grounded. On output side, an output is generated as the potential difference between reference voltage terminal $O_0$ and output terminal $O_1$.

Figure 2:
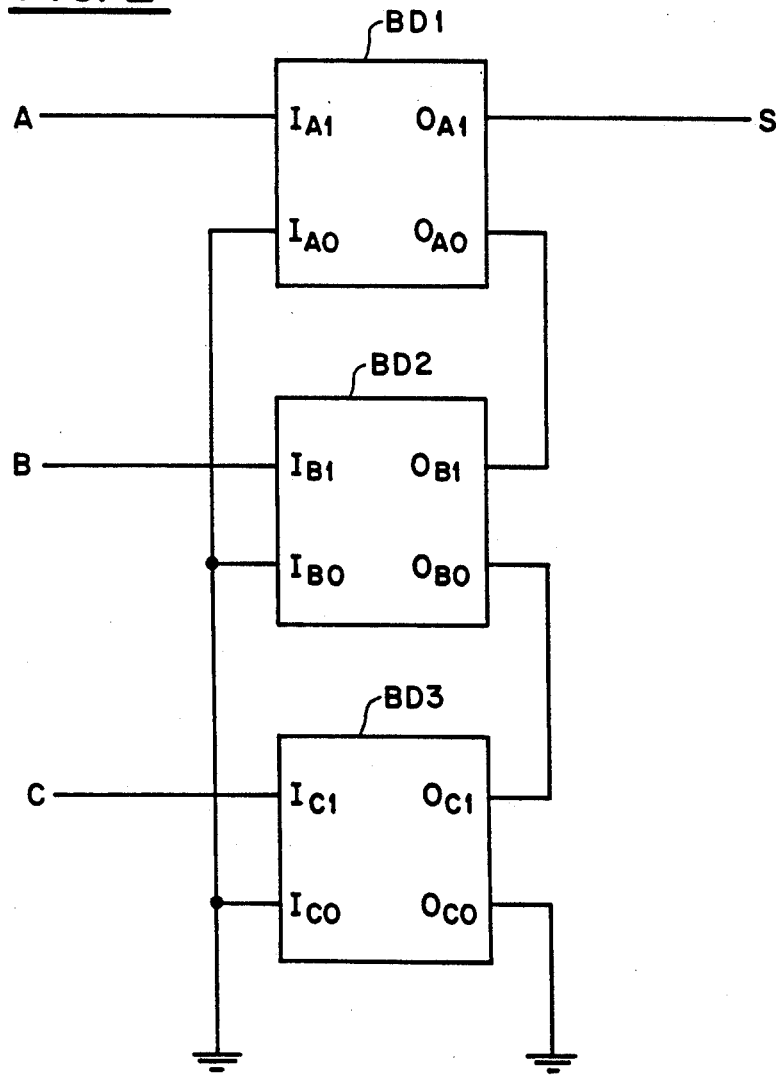
FIG. 2 shows a block diagram of an adder for a digit, which is a vase of an adder.

In FIG. 2, an adder for a digit using the fundamental element device comprises the first fundamental element device "BD1" for the first input "A", the second fundamental element device "BD2" for the second input "B" and the third fundamental element device "BD3" for carry-in "C". The first input "A" is input to non-invasive input "$I_{A1}$" of fundamental element device BD1, the second input "B" is input to non-invasive input "$I_{B1}$" of fundamental element device "BD2", and carry-in "C" is input to non-inversion input "$I_{C1}$" of fundamental element device "BD3". The output terminal "$O_{B1}$" of fundamental element device BD2 is connected to "$O_{A0}$" of reference voltage terminal on the output side of fundamental element device BD1; and the output terminal "$O_{C1}$" of fundamental element device BD3 is connected to "$O_{B0}$" of the reference voltage terminal on the output side of fundamental element device BD2. The inversion input terminals "$I_{A0}$", "$I_{B0}$" and "$I_{C0}$" on the input side of each fundamental element device BD1, BD2 and BD3 are grounded and "$O_{C0}$" of the reference voltage terminal $O_{C0}$ is also grounded. Output voltage "S" generated on output terminal $O_{A1}$ of the fundamental element device BD1 is higher than the ground by (A+B+C), and the computation $$S = A + B + C$$

is performed. Here, A and B are analog values and carry-in takes "0" or "1".

In this way, an analog adder can be realized for a digit including carry-in by simple structure using an operational amplifier.

Figure 3:
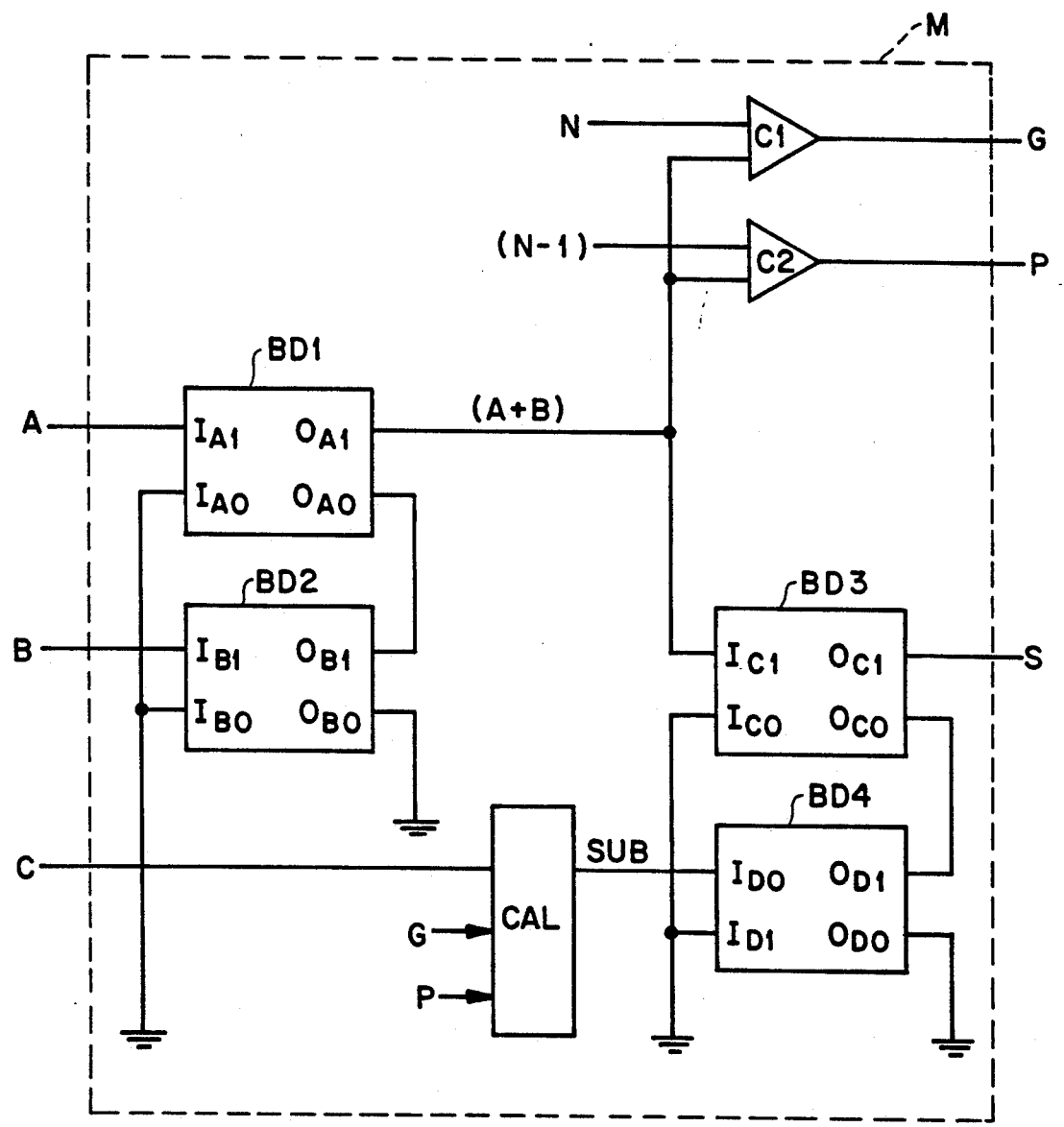
FIG. 3 shows a block diagram of an embodiment of this invention.

When the number of digits to be operated increases, such a structure to move carry-in in sequence to the next digit cannot operates in enough high speed and the structure of carry-look-ahead is necessary. FIG. 3 shows an adder of the type of carry-look-ahead using the fundamental element device. In FIG. 3, the adder comprises the first fundamental element device BD1 for the first input A and the second fundamental element device BD2 for the second input B. The first input A and the second input B are input to non-inversion input $I_{A1}$ of fundamental element device BD1 and non-inversion input $I_{B1}$ of fundamental element device BD2, respectively.

$O_{B1}$ of an output terminal of fundamental element device BD2 is connected to $O_{A0}$ of a reference voltage terminal of fundamental element device BD1 on an output side. $I_{B0}$ of inverse input terminal of fundamental element device BD2 and $O_{B0}$ of reference voltage terminal are grounded. The result of operation (A+B) is generated on $O_{A1}$ of an output terminal of fundamental element device BD1. This result of the operation is input to comparators C1 and C2 and compared with "N" of the radix of addition and (N−1), respectively. When (A+B) is equal to or more than N ((A+B)≧N), comparators C1 and C2 outputs 1. When (A+B) is less than N and equal to or more than (N−1) (N>(A+B)≧(N−1), comparator C2 outputs 1 and comparator C1 outputs O. That is, the output of comparator C1 is G-Flag (generation of carry-out) and that of comparator C2 is P-Flag (propagation of carry-in).

Carry-in "C" for an adder is input to an arithmetic unit "CAL". Then, the operation below is performed and output "SUB" is determined.

$$SUB = G \cdot P \times N + P \cdot C \times (N-1) + \overline{P} \cdot C \times (-1)$$

wherein:

×: Multiplication of Numerical Operation
+: Addition of Numerical Operation
−: Subtraction of Numerical Operation
·: Logical Multiplication
$\overline{P}$: Inversion of Variable "P"
N: Radix Output "SUB" is input to a subtraction circuit comprised of fundamental element devices BD3 and BD4. The last output "S" of the adder is calculated by subtracting SUB from (A+B).

$$S = (A+B) - SUB$$

The truth table of operation unit CAL is shown below.

| G   | 1   | 1 | 0   | 0 | 0  | 0 |
| --- | --- | - | --- | - | -- | - |
| P   | 1   | 1 | 1   | 1 | 0  | 0 |
| C   | 1   | 0 | 1   | 0 | 1  | 0 |
| SUB | N−1 | N | N−1 | 0 | −1 | 0 |

In the subtraction circuit, an output of fundamental element device BD1 is connected to non-inversion input of fundamental element device BD3, output terminal $O_{D1}$ of fundamental element device BD4 is connected to reference voltage terminal $O_{C0}$, and the last output "S" is output from the output terminal of fundamental element device BD3. Non-inversion input $I_{D1}$ and reference voltage terminal $O_{D0}$ are grounded.

Figure 4:
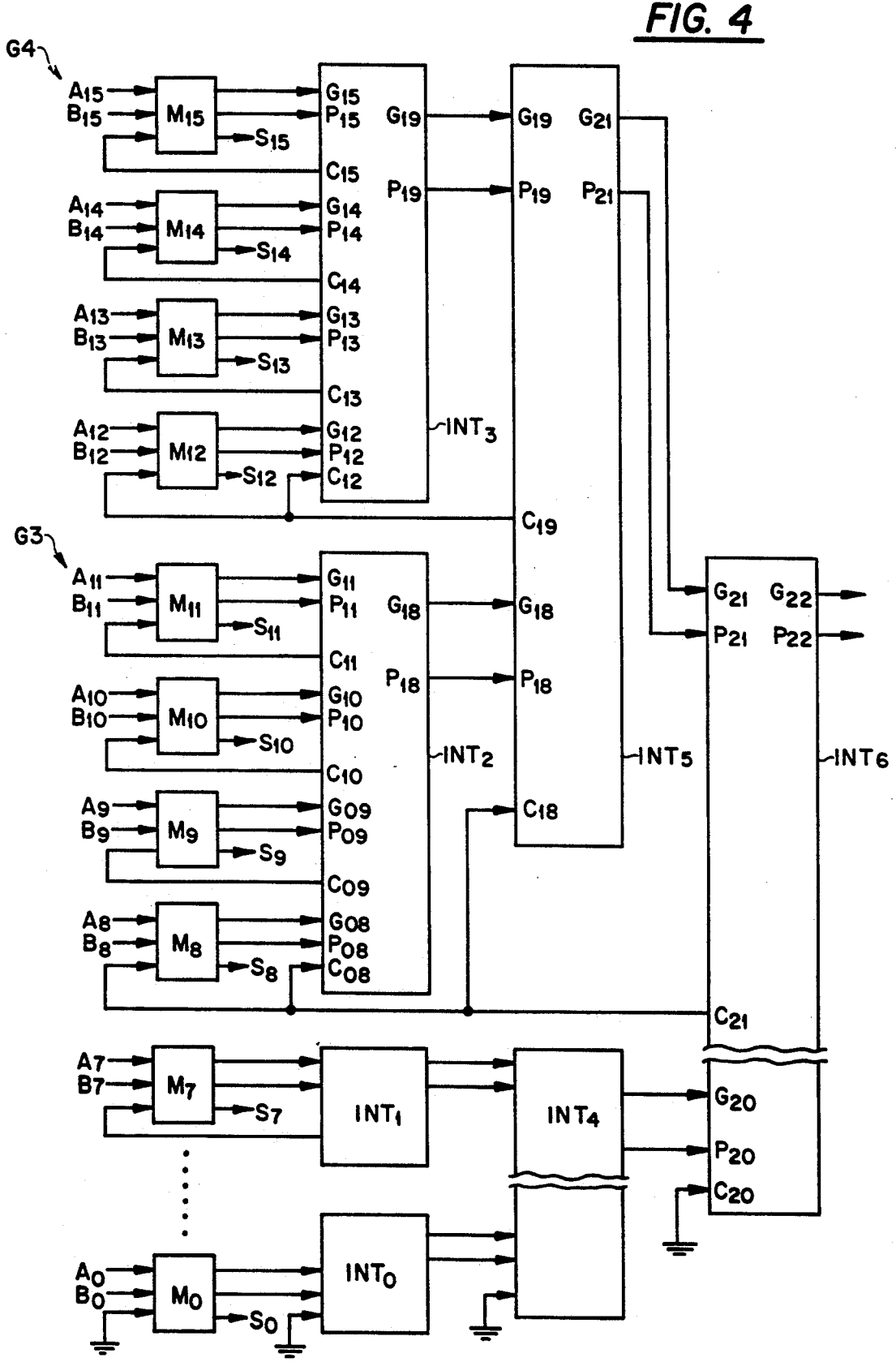
FIG. 4 shows a block diagram of G4, G3, INT3, INT2, INT5 and INT6 of an adder of multi-digits structured by the embodiment.
Figure 5:
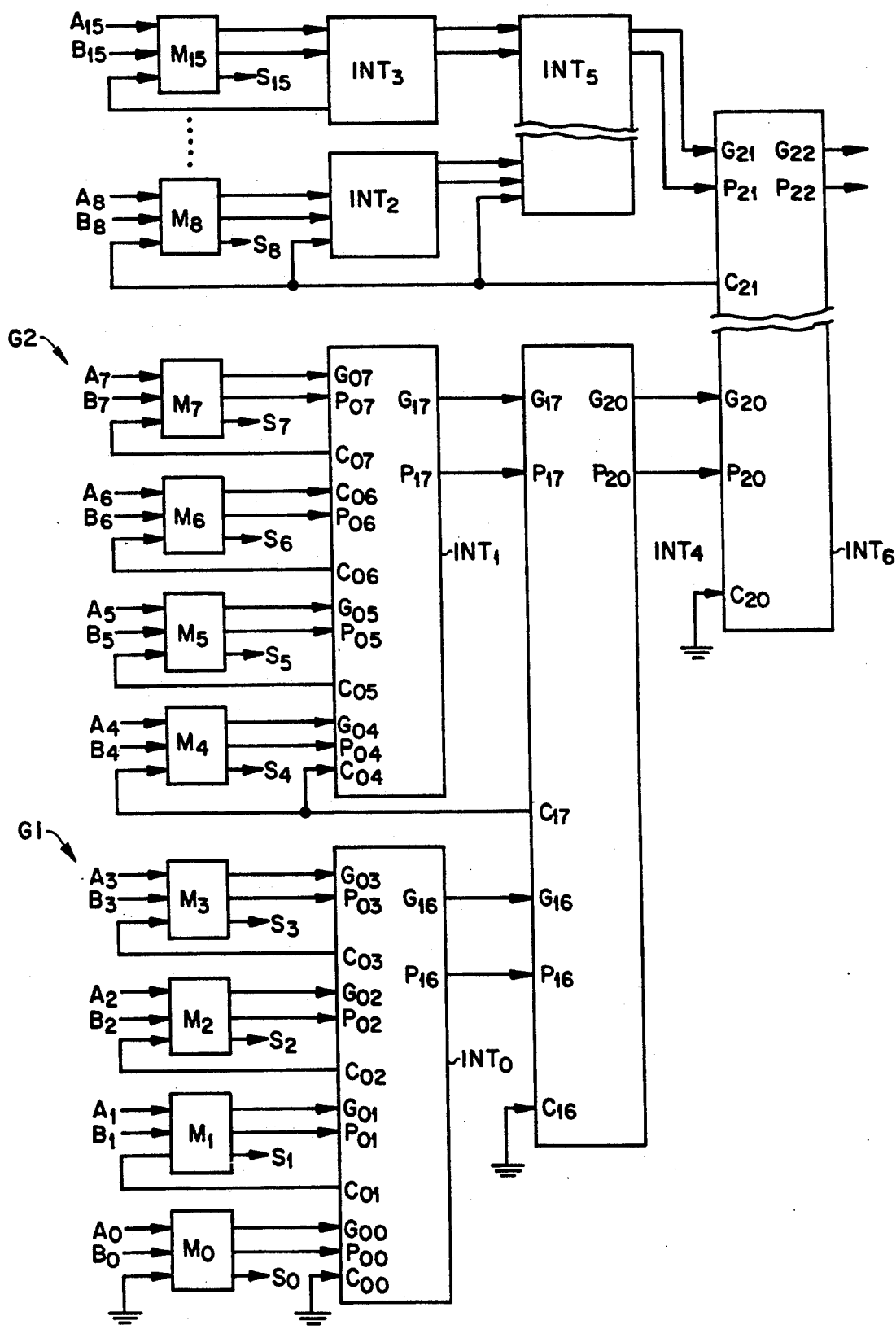
FIG. 5 shows a block diagram of G2, G1, INT2, INT1, INT4 and INT6 of an adder of multi-digits structured by the embodiment.

It can be obtained, by the above structure, an analog adder of carry-look-ahead-type, which obtains the last output by only one operation cycle delay from G-Flag and P-Flag. The examples of an adder of many digits of carry-look-ahead-type using such an adder as modules M1, M2, M3, M4, M5, M6, M7, ... are shown in FIGS. 4 and 5. Though the adders in FIGS. 4 and 5 are adders of 16 digits, it is possible to change the number of digits by extending or changing the circuit: it is well-known in the field of digital circuit.

In FIGS. 4 and 5, the adders comprises 16 modules from M0 to M15, which are corresponding to the number of digits of 16. The 16 modules are grouped by M0 to M3 ("group G1", hereinafter), M4 to M7 ("group G2", hereinafter), M8 to M11 ("group G3", hereinafter) and M12 to M15 ("group G4", hereinafter), and integrated by integration circuits from INT0 to INT3. It is possible to pre-read the carry in each group, and the one between G1 and G2, and between G3 and G4. Assuming the outputs of module M1 are "Si", "Pi" and "Gi", integrated circuit INTj ("j" is from 0 to 3) integrates the outputs of $P_{4j+k}$, $G_{4j+k}$ ("k" is from 0 to 3) are integrated. The outputs of integrated circuits INT0 and INT1 are integrated by the second step of integrated circuit INT4, the outputs of integrated circuits INT2 and INT3 are integrated by the second step of integrated circuit INT5, and at last, the outputs of INT4 and INT5 are integrated by the third step of integrated circuit INT6.

Integrated circuits from INT0 to INT6 comprise carry-in for inputting carries on the lower digits. The carry-ins C00, C16 and C20 of INT0, INT4, INT6 respectively, in the lowest digits of each step are grounded, and the carry-in of module M0 on the lowest digit is also grounded. To carry-ins C04 and C12 of integrated circuits INT1 and INT3, carry outs of integrated circuits INT0 and INT2 which are in lower step than INT1 and INT3 are fed back from integrated circuits INT4 and INT5 (that is, from C17 and C19). The carry out of integrated circuit INT4 is fed back to the carry-in of module M8, C08 and C18 which are carry-ins of integrated circuits INT2 and INT5, respectively.

The adder structured as above outputs the output of each module from S0 to S15 as the output of each digit. The last carry-out G22 exceeding MSB is output from integrated circuit INT6.

Modules from M0 to M15 are structured by the same circuit Integrated circuits from INT0 to INT3 are structured by the same circuits, and those from INT4 to INT6 are structured by the same circuits. Therefore, the circuit of an adder can be realized rather easily by combinating the common cell.

As mentioned above, the adder of this invention inputs an output of an operation amplifier to a reference voltage terminal on output side of another operation amplifier, performs addition by analog value, judges in digital if a carry is given to the upper digit or not on the result of the addition including a carry-in, and the result of the addition is changed suitably according to the judgment. It is possible to realize a device for performing an addition by analog values.

What is claimed is:

1. An adder comprising:
   i) the first operational amplifier wherein the first input is input to a non-inversion input terminal;
   ii) the second operational amplifier wherein the second input is input to a non-inversion input and an output terminal is connected to a reference voltage terminal on output side of said first operational amplifier;
   iii) the first comparator for outputting "1" when an output of said first operational amplifier is more than a radix and for outputting "0" on other cases;
   iv) the second comparator for outputting "1" when an output of said first operational amplifier is equal to or more than "the value smaller by '1' than said radix" and for outputting "0" on other cases; and
   v) a calculator inputted an output of the first and second comparator and a carry-in, wherein said radix is subtracted from the sum of said first and second input when an output of said first comparator is "1", "said value smaller by '1' than said radix" is subtracted from said sum of said first and second input when an output of said second comparator is "1" and a carry-in is "1", "1" is added to the sum of said first and second inputs when said outputs of said first and second comparators are "0" and a carry-in is "1", "0" is subtracted on other cases.

* * * * *